United States Patent
Jennings

(10) Patent No.: US 7,673,650 B2
(45) Date of Patent: *Mar. 9, 2010

(54) SENSITIVE FLUID BALANCING RELIEF VALVE

(76) Inventor: Jeffrey D. Jennings, 29 Thistlewood La., Hendersonville, NC (US) 28791

( * ) Notice: Subject to any disclaimer, the term of this patent is extended or adjusted under 35 U.S.C. 154(b) by 294 days.

This patent is subject to a terminal disclaimer.

(21) Appl. No.: 11/459,816

(22) Filed: Jul. 25, 2006

(65) Prior Publication Data

US 2006/0249207 A1 Nov. 9, 2006

Related U.S. Application Data

(63) Continuation-in-part of application No. 11/093,071, filed on Mar. 29, 2005, now Pat. No. 7,080,660, which is a continuation of application No. 10/122,673, filed on Apr. 15, 2002, now Pat. No. 6,886,591.

(51) Int. Cl.
G05D 16/02 (2006.01)

(52) U.S. Cl. .................. 137/510; 137/494

(58) Field of Classification Search ............ 137/494, 137/495, 510; 251/48, 53
See application file for complete search history.

(56) References Cited

U.S. PATENT DOCUMENTS

| 2,563,665 | A | * | 8/1951 | Thomas | 137/510 |
|---|---|---|---|---|---|
| 2,986,881 | A | * | 6/1961 | Moore | 60/787 |
| 3,642,026 | A | * | 2/1972 | Sielaff | 137/859 |
| 3,768,279 | A | * | 10/1973 | Butler | 66/147 |
| 4,205,637 | A | * | 6/1980 | Ito et al. | 123/447 |
| 4,375,824 | A | * | 3/1983 | von Borries et al. | 137/614.17 |
| 4,615,320 | A | * | 10/1986 | Fehrenbach et al. | 123/467 |
| 4,625,759 | A | | 12/1986 | Craig | |
| 4,679,421 | A | | 7/1987 | Barree | |
| 4,712,580 | A | | 12/1987 | Gilman et al. | |
| 4,846,215 | A | | 7/1989 | Barree | |
| 4,903,721 | A | | 2/1990 | Maier | |
| 4,960,740 | A | | 10/1990 | House et al. | |
| 4,981,157 | A | | 1/1991 | Denkinger | |
| 5,265,645 | A | | 11/1993 | Goodwin | |
| 5,520,215 | A | * | 5/1996 | Haboush | 137/510 |
| 5,944,050 | A | | 8/1999 | Walker | |
| 5,967,120 | A | * | 10/1999 | Blanton et al. | 123/467 |
| 6,095,183 | A | | 8/2000 | Taylor et al. | |
| 6,318,406 | B1 | | 11/2001 | Conley | |
| 6,886,591 | B2 | * | 5/2005 | Jennings | 137/510 |
| 7,080,660 | B2 | * | 7/2006 | Jennings | 137/510 |

OTHER PUBLICATIONS

Insight Process Solutions, drawings of pressure regulator offered for sale prior to Jul. 25, 2005 (6 sheets).

* cited by examiner

*Primary Examiner*—Stephen Hepperle
(74) *Attorney, Agent, or Firm*—Trego, Hines & Ladenheim, PLLC

(57) ABSTRACT

A pressure regulating valve comprising a diaphragm for control of process pressure is provided. The diaphragm has a reference pressure on a first side and a process pressure on a second side. The second side is engagable with a process void and at least one vent void such that when the process pressure is below the reference pressure the diaphragm is engaged with the vent void. When the process pressure is above the reference pressure the diaphragm is not engaged with the vent void.

20 Claims, 11 Drawing Sheets

SENSITIVE FLUID BALANCING RELIEF VALVE

CROSS-REFERENCE TO RELATED APPLICATIONS

This application is a Continuation in Part of U.S. application Ser. No. 11/093,071, filed Mar. 29, 2005, which is a Continuation of application Ser. No. 10/122,673 filed on Apr. 15, 2002, now U.S. Pat. No. 6,886,591.

FIELD OF THE INVENTION

The present invention relates to a new and improved modulated pressure relief valve which balances vessel or line pressure against a reference pressure signal.

BACKGROUND

There has been a long felt desire for a modulated pressure relief valve on a vessel for venting fluid when the pressure exceeds a desired dynamic set-point or threshold. A particular desire is for a modulated pressure relief valve with a threshold that could vary according to process requirements and its upper limit could serve to avoid blowing a safety relief device such as an expendable rupture disc or pop-off safety relief valve both of which are typically designed for infrequent use. It is desirable to communicate the desired pressure set-point to the relief valve via a reference pressure signal (typically air) that is equal to the desired vessel pressure.

Furthermore, it is desirable to have a modulating pressure relief valve which is very simple, with cleanable parts and with no narrow passageways that can become plugged with debris or frozen product. Such a device would be useful in many applications including the food, beverage, gelatin, and polymer industries, where the product can become frozen in critical passages, and where all crevices must be exposed to the rinsing and cleaning processes.

Typical safety relief valves, such as those exemplified in U.S. Pat. No. 6,095,183, include a valve member biased by a spring into engagement with a seat. If product pressure exceeds a predetermined level, the force against the valve exceeds the biasing force of the spring causing the valve to lift from the seat to vent product pressure.

Typical diaphragm relief valves, such as those exemplified in U.S. Pat. No. 5,944,050, do present simple, cleanable surfaces yet they clearly do not meet the dynamic set-point requirement desired in the art. Furthermore, the inaccuracies of the spring compression typically result in wide variations in relieving pressures, often greater than 10%, and the variations change over time.

Dynamically modulated relief valves are provided that use a reference or pilot signal as exemplified in U.S. Pat. No. 6,318,406. These typically involve complex spring and seal mechanisms. Besides the inherent robustness issues with the complex mechanisms, they are clearly not acceptable for use in processes with debris, freezeable product, or requiring cleanability.

Typical relief valves are quite insensitive to slight differences in pressure, and typically have large cracking pressure biases. A highly sensitive relief valve would help maintain a constant vessel pressure during changes in the upstream process environment which is a feature that is very useful in many industrial steady-state applications, including constant-flow applications.

Further, there has been a long felt desire for a relief valve that could balance vessel pressure exactly to a reference, or pilot, pressure. This would facilitate a complete vessel pressure control system when used in conjunction with a simple instrument pressure sender and a, preferably no-loss, check valve.

Typically available pilot actuated relief valves cannot control vessel pressure to the exact pressure of the reference signal.

Many fluid systems also exhibit pulsations, which are typically caused by mechanical sources such as pump movements or valve closures. An additional type of pulsation is found with certain sensitive fluid control devices, which can exhibit undesirable chatter (or pulsations) when used with incompressible fluids. An example of this phenomenon occurs when a positive pressure wave travels upstream and strikes the outlet of the regulator, whereby said positive pressure wave temporarily imbalances the membrane and causes a positive flow bias to emanate from the device. Such a positive flow bias becomes a positive pressure wave traveling back downstream. This response manifests itself as an echo, allowing resonance to become established in the fluid conduit downstream of the fluid control device.

It is desirable to eliminate such pulsations in such fluid systems. Furthermore, it is desirable to inhibit said chatter in a way that it permanent and robust, with no maintenance required. Furthermore, it is desirable to inhibit said chatter in a way that is hygienic and allows for easy cleaning of the fluid system. Furthermore, it is desirable to inhibit said chatter in a way is economical, easy to incorporate into the fluid system design, does not require a separately sealed component, and cannot obstruct the flow through the system.

It is known in the art that altering the compressibility of a fluid system can control the resonant chatter in said system. Said compressibility is traditionally established by incorporating a pulsation dampener, which typically involves the addition of a gas pocket into the system. Said gas pocket may be in direct contact with the fluid, or may be separated by a flexible membrane. The gas pocket typically requires the addition of a separate fluid component, with its costs, space requirements, maintenance requirements, costs, connections, and potential for leaks. Furthermore, gas tends to become absorbed over time into liquids where direct contact exists, requiring some form of replenishment. Gas can also leak out slowly through flexible separation membranes over time as well due to membrane permeability or microscopic leaks. Another pulsation dampening method existing in the art is the use of tubing with flexible walls. However, the use of flexible conduit material requires additional sealing points, and is limited by the pressure rating of said flexible tubing.

SUMMARY OF THE INVENTION

In light of the above-noted shortcomings of the prior art, it is an object of the invention to provide a pressure relief device which is simple and cleanable, making it useful in a variety of process applications where debris, freezeable product, or sanitary requirements prohibit recesses or crevices.

A further objective of the invention is the ability to control vessel pressure via a remote pressure reference signal, such as commonly used in industrial control systems.

Particular features of the relief device include, simplicity and cleanability, response to remote reference signal and high sensitivity to slight differences between the reference pressure and process pressure to achieve complete balance between vessel and reference pressure.

A further objective of the invention is to perfectly balance vessel pressure with the reference pressure, so as to facilitate a completely automated vessel pressure control system, both filling and relieving, by adding only a pressure sending device isolated from the process by a check valve.

In a preferred embodiment vessel pressure is generated in a forward direction by a pressure sender through a check valve while all reductions in vessel pressure are conducted by a modulating pressure relief valve with reference pressure communicated directly from a pressure sender.

Yet another objective of the invention is to provide a device with high pressure sensitivity, while preventing the unnecessary venting of process fluids. This invention is imminently suitable for protecting sensitive instrumentation from moisture, foam or debris from the vessel venting process.

The present invention is a floating diaphragm relief device which balances vessel, or line pressure, against a reference pressure signal. A simple flexible diaphragm constrained on its periphery, separates the reference fluid chamber on one side from a specific seating surface on the other side. This seating surface contains a connection to both the vessel, line or upstream process and vent or downstream environment. The seating surface preferably contains one or more vent holes of varying, but defined, sizes, which, when the diaphragm is not fully seated against them, can communicate from the vessel or line to the vent or lower pressure environment.

A particularly preferred embodiment is provided in a relief valve comprising a diaphragm. The diaphragm has a fluid pressure on a first side and a process pressure on a second side. The second side is engagable with a process void and at least one vent void such that when the process pressure is at or below the fluid pressure the diaphragm is engaged with the vent void. When the process pressure is above the fluid pressure the diaphragm is not engaged with the vent void.

Another preferred embodiment is provided in a relief valve. The relief valve comprises a process housing which comprises a process void and at least one vent void. The process void is in pressure communication with a process system, with a process pressure. The vent void selectively allows material to flow from the process system through the vent void. A reference housing is provided wherein the reference housing contains a fluid at a predetermined pressure. A diaphragm is between the process housing and the reference housing and capable of engaging with the vent void and the process void. When the reference pressure is equal or higher than the process pressure the diaphragm is engaged with the vent void. When the process pressure is higher than the reference pressure the diaphragm is not engaged with the vent void and the process pressure can decrease through the vent void.

Another particularly preferred embodiment is provided in a relief valve. The relief valve comprises a diaphragm between a reference housing and a process housing. The process housing comprises a reference void, in pressure communication with a process vessel at a process pressure, and a vent void. The reference housing comprises a fluid at a reference pressure. When the reference pressure equals or exceeds the process pressure the diaphragm is engaged with the vent void and when the process pressure exceeds the reference pressure the diaphragm is not engaged with the vent void and the process pressure decreases by venting through the vent void.

According to another embodiment of the invention, an apparatus is provided for the prevention of fluid chatter or pulsation from a pressuring regulating valve of the type including an exhaust chamber through which fluid is expelled during operation, the apparatus including: a flexible membrane adapted to be mounted with a first surface thereof disposed in communication with the exhaust chamber; and a compressible member disposed in contact with a surface of the membrane opposite the first surface, so as to absorb pulsation energy during the operation of the pressure regulating valve.

According to another embodiment, a pressure regulating valve includes: a body including: a wall with a first side which defines a process surface, at least one process void disposed in the process surface and adapted to be disposed in fluid communication with a fluid at a process pressure, and at least one vent void disposed in the wall separate from the process void; an inlet port disposed in fluid communication with the at least one process void; an outlet port disposed in fluid communication with the at least one vent void, wherein a central axis of the of the outlet portion lies substantially in a single plane with a central axis of the inlet port; a reference housing adapted to be disposed in fluid communication with a fluid at a predetermined reference pressure; and a membrane having opposed reference and process surfaces, the membrane constrained in a predetermined plane between the body and the reference housing, and arranged such that, when the reference pressure is higher than the process pressure the membrane is engaged with the vent void, and when the process pressure is higher than the reference pressure, the membrane is not engaged with the vent void.

According to another embodiment, a pressure regulating valve includes: a body including: a wall with a first side which defines a process surface, at least one process void disposed in the process surface and adapted to be disposed in fluid communication with a fluid at a process pressure, and at least one vent void disposed in the wall separate from the process void and disposed in parallel flow communication with the membrane; an inlet port disposed in fluid communication with the at least one process void; an exhaust chamber disposed in fluid communication with the at least one process void; an outlet port disposed in fluid communication with the exhaust chamber; a reference housing adapted to be disposed in fluid communication with a fluid at a predetermined reference pressure; a first membrane having opposed reference and process surfaces, the first membrane constrained in a predetermined plane between the body and the reference housing, and arranged such that, when the reference pressure is higher than the process pressure the first membrane is engaged with the vent void, and when the process pressure is higher than the reference pressure, the first membrane is not engaged with the vent void; a bottom cap secured to the body; a flexible second membrane constrained between the body and the bottom cap, in sealing relationship with the exhaust chamber, with a first surface thereof disposed in communication with the exhaust chamber; and a compressible member disposed in contact with a surface of the second membrane opposite the first surface thereof, so as to absorb pulsation energy during the operation of the pressure regulating valve.

According to another embodiment, a pressure regulating valve includes: a body including: a wall with a first side which defines a process surface; at least one process void adapted to be disposed in fluid communication with a fluid at a process pressure; at least one vent void disposed in the wall; an inlet port disposed in fluid communication with the at least one process void; an outlet port disposed in fluid communication with the at least one vent void, a reference housing adapted to be disposed in fluid communication with a fluid at a predetermined reference pressure; and a fiber-reinforced elastomeric membrane with a thickness of substantially less than 0.020 inches, the membrane having opposed reference and process surfaces, the membrane constrained in a predetermined plane between the body and the reference housing, and arranged such that, when the reference pressure is higher than the process pressure the membrane is engaged with the vent void, and when the process pressure is higher than the reference pressure, the membrane is not engaged with the vent void.

According to another embodiment, a pressure regulating valve includes: a body including: an upstanding central chamber having a wall whose first side defines a process surface with a plurality of vent voids therein; an outer wall surrounding the central chamber, the outer wall spaced apart from the central chamber to define an annular process void; at least one process port disposed in fluid communication with the process void, wherein a lowest surface of each process port is substantially flush with a lower portion of the process void, so as to permit fluid to be substantially completed drained from the body; a reference housing adapted to be disposed in fluid communication with a fluid at a predetermined reference pressure; and a diaphragm disposed between said process housing and said reference housing and arranged such that, when said reference pressure is higher than said process pressure said diaphragm is engaged with said vent voids, and when said process pressure is higher than said reference pressure, said diaphragm disengages from a number of said vent voids proportional to the difference between said process pressure and said reference surface.

DETAILED DESCRIPTION

Figure 1:
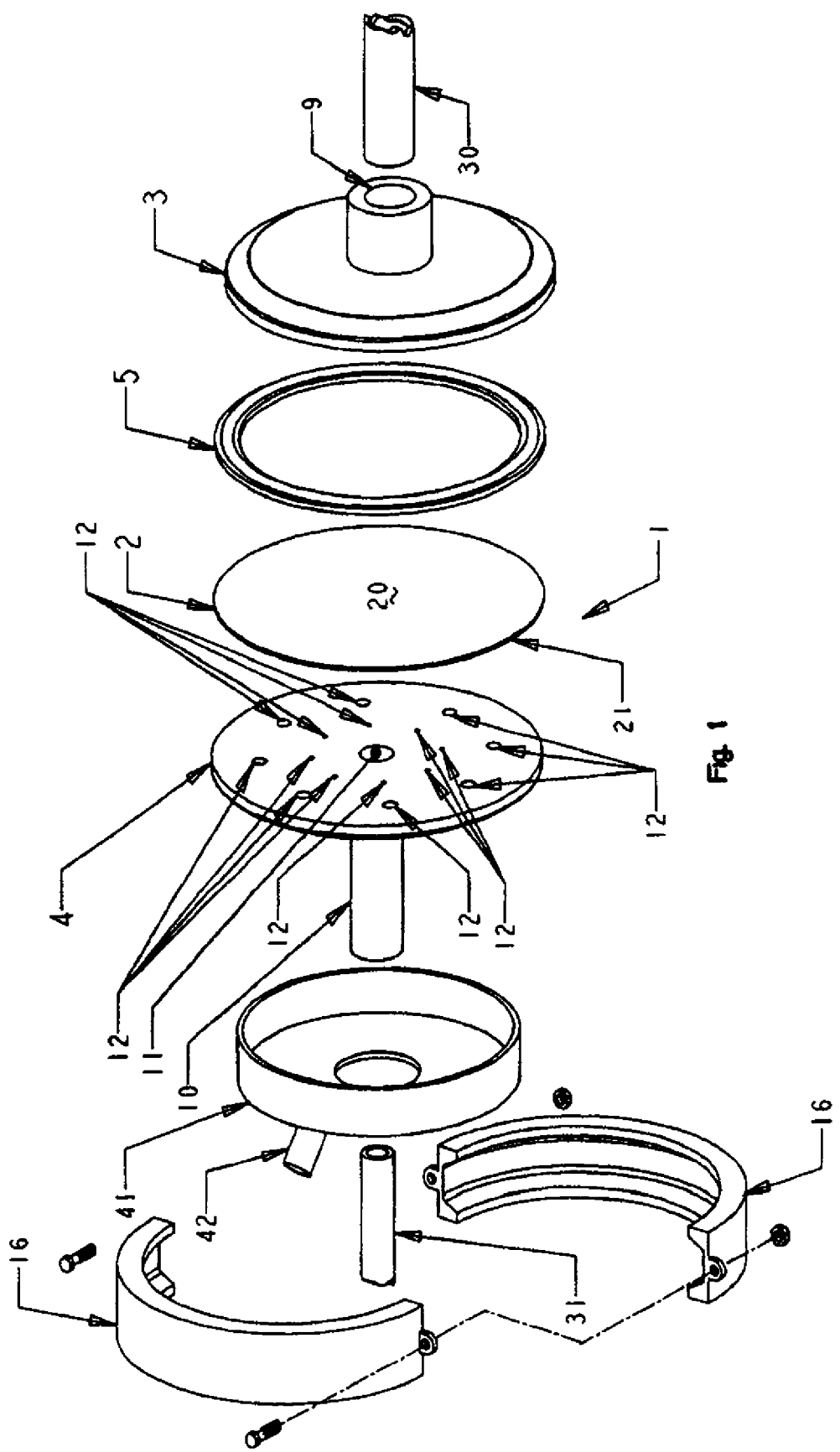
FIG. 1 is an exploded perspective view of an embodiment of the present invention.

The invention is described with reference to the drawings. The drawings are provided to facilitate discussion of the invention and are not intended to limit the invention in any way. In the drawings all similar elements are numbered accordingly.

An embodiment of the present invention is provided in FIG. 1. In FIG. 1, the modulated pressure relief valve, generally represented at 1, is shown in exploded perspective view. The modulated pressure relief valve, 1, comprises a diaphragm, 2, which is enclosed between a reference housing, 3, and a process housing, 4. The diaphragm, 2, comprises a reference surface, 20, and a process surface, 21, which is opposite the reference surface. For the purposes of the present application the volume between the reference surface of the diaphragm and reference housing is referred to as the reference volume and the area between the process surface of the diaphragm and the process housing is referred to as the process volume. An optional seal, 5, can be employed between the diaphragm and reference housing, between the diaphragm and process housing, or both to insure that the entire assembly is sealed relative to operating pressure ranges which are anticipated.

The reference housing, 3, comprising a reference coupling, 9, which engages with a reference pressure source, 30. The reference coupling, 9, can be any coupling typically employed for connecting a fluid source to a device. Threaded couplings, compression couplings, ferruled couplings, soldered couplings, welded couplings, barbed couplings attached to flexible tubing and the like are imminently suitable for the demonstration of the invention. It would be well within the ability of one skilled in the art to attach a pressure system to a coupling and further description herein is not warranted.

The process housing, 4, comprises a process coupling, 10, which attaches to a process system, 31, within which the pressure is to be maintained. The process coupling, 10, can be any coupling typically employed for connecting a pressure regulator, or pressure release to a process vessel or line. Threaded couplings, compression couplings, ferruled couplings, soldered couplings, welded couplings, barbed couplings attached to flexible tubing and the like are imminently suitable for the demonstration of the invention. It would be well within the ability of one skilled in the art to attach a process system to a coupling and further description herein is not warranted.

The process housing, 4, comprises a process void, 11, which is in pressure communication with the process vessel such that the pressure at the process void is proportional to the pressure in the process vessel. In a particularly preferred embodiment the pressure at the process void is approximately equal to the pressure in the process vessel. In another embodiment the pressure at the process void is proportional to the pressure in the process vessel as would be realized when pressure reduction devices are utilized between the process vessel and modulated pressure relief valve as known in the art. At least one vent void, 12, is provided in the process housing, 4. The vent void, 12, is in flow communication with the environment exterior to the process vessel. As will be more fully understood from further descriptions when the pressure exerted on the reference surface of the diaphragm exceeds the pressure on the process surface of the diaphragm at the process void 11, the process void and vent voids are engaged by the diaphragm thereby sealing the vent void and prohibiting material, or the pressure created by material, from passing through the vent void. When the pressure in the process void, 11, is sufficient to dislodge the diaphragm from sealing engagement with the process void the diaphragm is persuaded towards the reference housing thereby disengaging the diaphragm from at least one vent void thereby forming a flow channel from the process void to the vent void whereby the pressure is released through the vent void.

Figure 2:
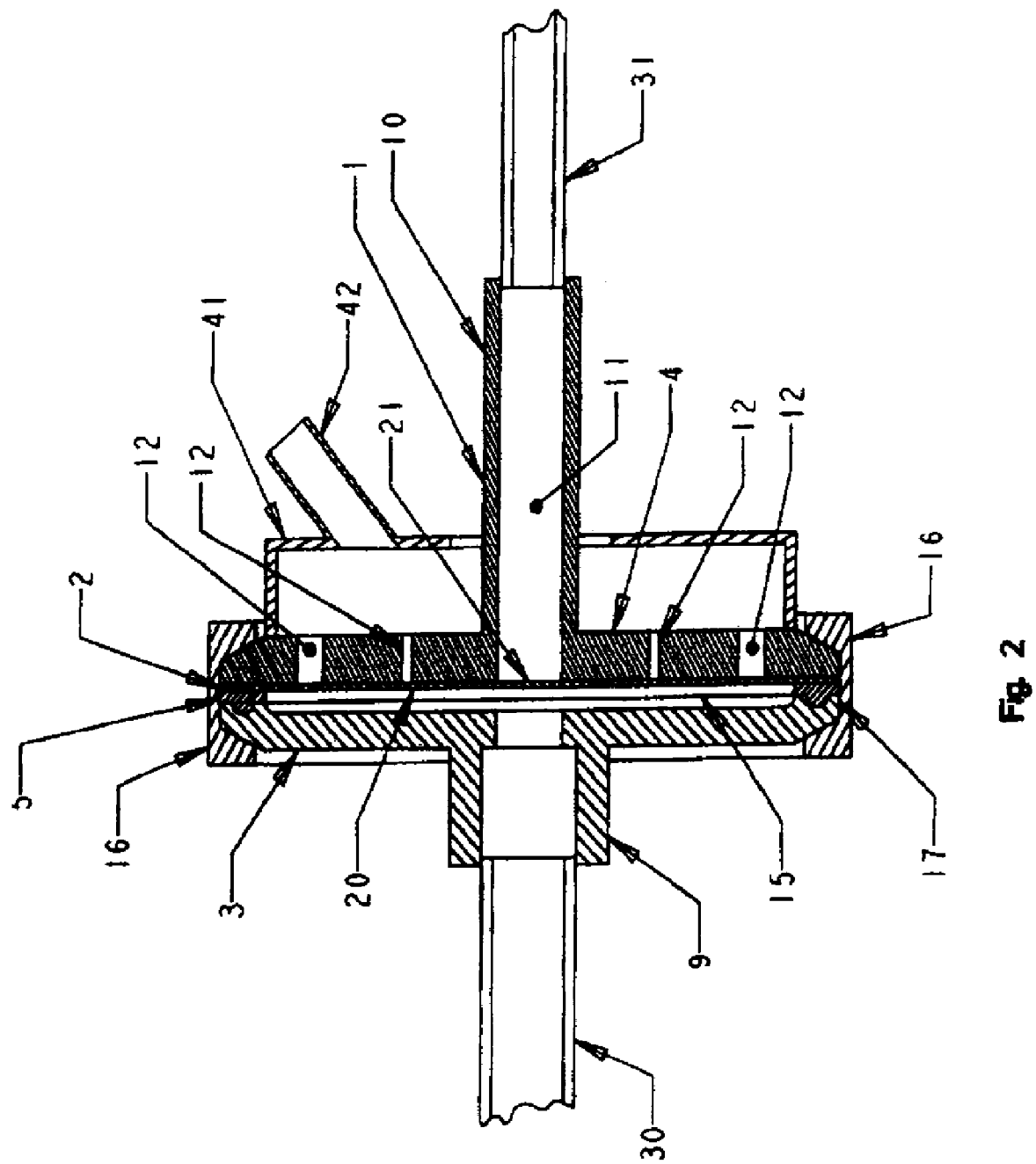
FIG. 2 is a cross-sectional view of an embodiment of the present invention.

A cross-sectional view of the modulated pressure relief valve is shown in FIG. 2 as it would appear when the pressure on the reference surface, 20, of the diaphragm, 2, exceeds the pressure on the process surface, 21, of the diaphragm. In this condition the reference volume, 15, is maximized and the process volume is essentially non-existent. As the pressure exerted on the area of the process surface, 21, increases due to an increase in pressure in the process coupling, 10, the diaphragm is persuaded away from the process housing thereby distorting the diaphragm. If the pressure on the process surface, 21, increases the process volume enlarges at the expense of the reference volume. As the process volume increases the diaphragm continues to be distorted until the diaphragm disengages with at least one vent void, 12, at which point the pressure is released through the vent void thereby allowing pressure to lower until the pressure is reduced to a pressure equal to the pressure in the reference volume at which point the process volume decreases and the diaphragm reengages with the vent void. It would be apparent from the description that the higher the pressure difference between the vessel and the reference coupling the more distorted the diaphragm becomes and therefore the diaphragm disengages with more vent voids.

An optional vent hood, 41, is provided whereby all material transiting through the vent void is captured and collected through a vent port, 42. It would be readily apparent that each vent void may have a separate vent port attached thereto. The vent ports allow the vented material to be captured and released as appropriate.

A clamping mechanism, 16, with a receiving inset, 17, is provided in FIG. 2 wherein the modulated pressure relief valve is received in the inset, 17, to maintain the reference housing and process housing in sandwiched relationship with the diaphragm there between. The clamping mechanism could be a clamp, matching tabs, pliable ring seal or any mechanism capable of maintaining the modulated pressure relief valve in sandwiched relationship. It is well within the ability of one skilled in the art to utilize clamping mechanisms suitable for the application which would maintain the modulated pressure relief valve in the appropriate sandwiched relationship.

Figure 3:
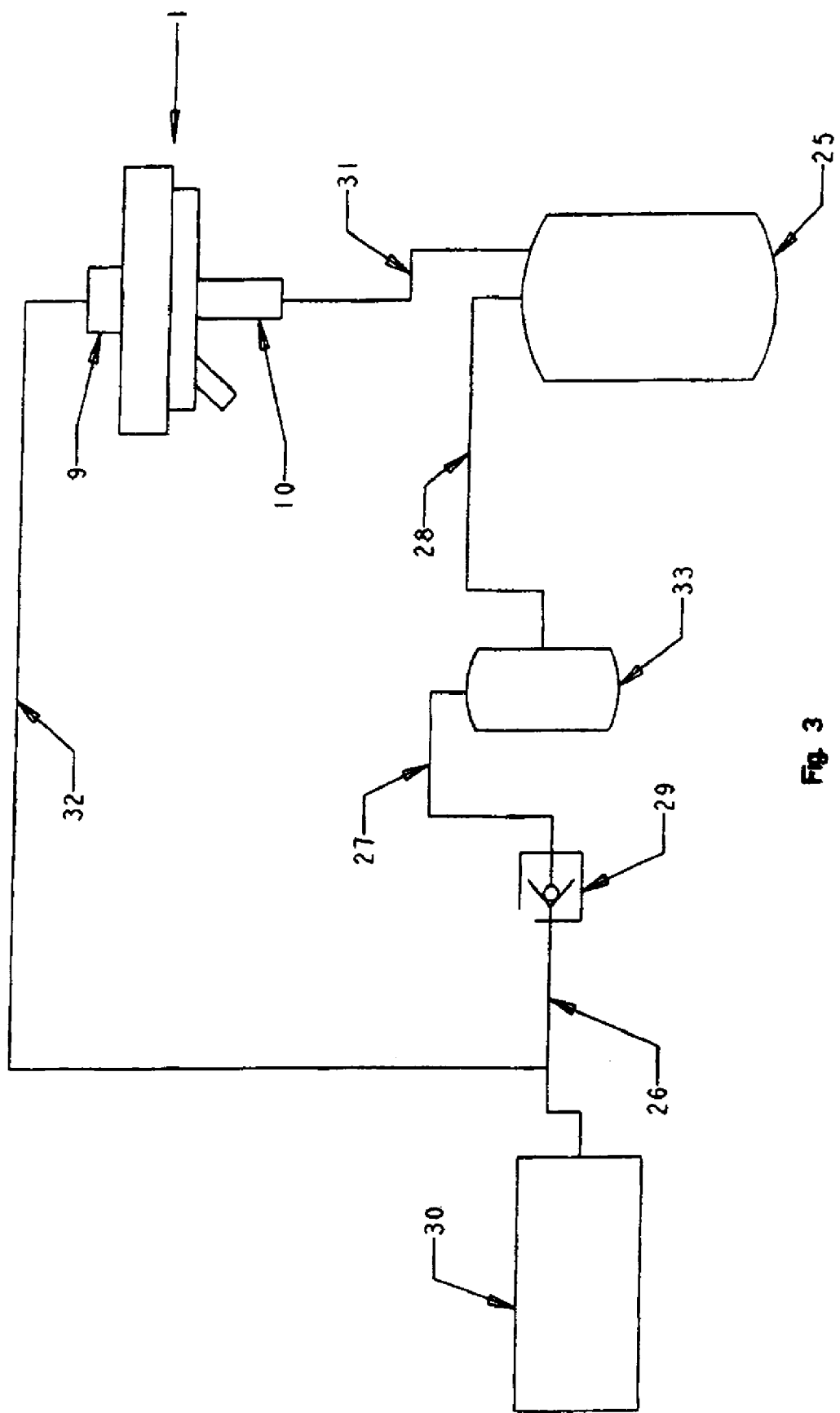
FIG. 3 is a schematic representation of a system incorporating the present invention.

A schematic representation of a process system incorporating the modulated pressure relief valve is provided in FIG. 3. In FIG. 3, the modulated pressure relief valve, 1, is integral to a pressure control system which includes a process vessel, 25, and pressure reference source, 30. The process vessel, 25, is connected to the process coupling, 10, of the modulated pressure relief valve, 1, by a process line, 31, as would be readily understood to one of ordinary skill in the art. The reference coupling, 9, of the modulated pressure relief valve, 1, is connected to the reference pressure source, 30, by a process line, 32, as would be readily understood to one of ordinary skill in the art to form a control loop. An optional, but preferred, feed back loop, comprising a check valve, 29, and optional separator, 31, provides optimal control of the pressure within the process vessel. The check valve, 29, is preferably a one-way flow valve allowing flow towards the direction of the process vessel but not counter thereto. The process vessel, 25, separator, 33, check valve, 29, and reference pressure source, 30, are connected, preferably in series, by process lines, 28, 27, and 26 respectively. The pressure in the process vessel is maintained by venting through the modulated pressure relief valve, 1, or by replenishment through the check valve, 29. The system allows for accurate, rapid pressure control in the process vessel. By way of example, if the operator desires to increase the pressure in the process vessel the pressure from the reference pressure source is increased. The pressure above the diaphragm would then be increased and the air (or other fluid) would flow through the check valve. Once the pressure in the process vessel equals the pressure supplied by the reference pressure source the check valve and modulated pressure relief valve are both closed thereby the system pressure is neutral. It would be apparent that, in typical manufacturing configurations, there is a possible pressure drop in the lines leading to the vessel. This pressure drop may be more than the corresponding pressure drop in the lines leading to the modulated pressure relief valve. This is advantageous for the present invention but not required. If the operator desires to lower the pressure in the process vessel the pressure supplied by the reference pressure source is decreased. The pressure exerted on the diaphragm will then be lower on the reference face of the diaphragm and the process pressure will be allowed to vent until the pressure on each side of the diaphragm is rebalanced.

It is well known in the art that many control systems, particularly flow based control systems, do not adjust to a given level but instead typically go beyond the intended control level and then correct. This oscillatory approach is mitigated by the present invention which represents a particular advantage. Due to the ability of the modulated pressure relief valve to rapidly vent a system, as illustrated in FIG. 3, it balances the pressure introduction sufficiently to minimize the build up of pressure above the desired pressure.

The knowledge provided herein and understanding related to selection and location of the diaphragm, in conjunction with the placement, size, and shape of the vent voids, give the device a characterized performance curve. In practice, the valve can modulate between the closed state and cracked state, wherein venting occurs, with pressure differentials below ¼ psi.

A diaphragm is situated across a surface containing both the process void, from vessel or line, and a variety of smaller vent voids. On the reference surface of the diaphragm, the pressure reference fluid, preferably air, provides balancing forces. The sensitivity of the device is provided by the size of the vent voids from which the diaphragm is easily dislodged by low pressure differences. Greater relief volume is provided by progressively larger vent voids. The distance between the diaphragm and the interior surface of the reference housing, which determines the reference volume, is a critical parameter in predicting and controlling the sensitivity of the device.

The characteristics of the diaphragm are integral to the performance of the device. Excellent sensitivity has been achieved with a flexible diaphragm with reinforcement fibers to prevent excessive stretching.

There are three fluid pressures acting on the diaphragm, process pressure, vent pressure, and reference pressure. The diaphragm serves to balance the process pressure and reference pressure.

During normal balanced or modulating mode the diaphragm is drawn into a sealing relationship with the vent voids due to the pressure differential between the vent pressure and reference pressure. When the vessel pressure exceeds the reference pressure the area of the diaphragm between the vent voids is persuaded away from the outlet holes thereby allowing venting. This motion, however, is limited by the pressure exerted on the inner surface of the reference housing. The diaphragm is forced into an irregular pattern, with regions closely surrounding the vent voids being unsupported by the interior surface of the reference housing, and therefore trying to pull the diaphragm out of contact with the outlet hole. At the smallest holes, the ratio of unsupported diaphragm area to outlet hole area can be very high, such as 400:1 for example. When the ratio of pressure differential ratio, which is defined as the differential Vessel—Reference divided by Reference-Vent, rises to the area ratio, which is defined by the unsupported diaphragm area divided by the area of the vent void, then that particular vent void begins to crack open or modulate. The valve preferably opens up the smaller vent voids first, and gradually progresses to the larger vent voids. At higher differential pressures, such as several psi, the entire hole pattern opens up to allow higher venting volumes.

The selection of hole size and spacing controls the relieving capacity and the sensitivity of the device. The desired combination of high relieving capacity and high sensitivity can be achieved by combining both small holes and large holes in the same device. The smaller the size of the smallest vent voids, the greater the sensitivity of the device. In one embodiment a device with a minimum vent void diameter of 0.042", would yield a cracking sensitivity of approximately ¼ psi. Smaller vent voids would be expected to provide more sensitivity. In one embodiment the vent void is a frit with multiple flow paths through a given vent void. The vent voids are preferably large enough to avoid pluggage by contaminants in the fluid stream, and small enough to provide the required cracking sensitivity.

The number of small vent voids determines the relieving capacity of the device in the lower pressure differential range. While one very small vent void would provide a sensitive device that cracks at very low pressure differentials, it might not produce the needed effect on the system because the relieving volume of that hole might not be enough to control the system pressure. Therefore, a number of small vent voids may be provided such that the sum of their cross sectional area relates, proportionally, to the expected required relieving capacity. A vent void housing comprising 8 small holes, symmetrically arranged, is suitable for demonstration of the present invention.

Larger vent voids contribute to higher relieving capacity at the higher differential pressures. The ultimate relief capacity will be proportional to the sum total of all vent void cross sectional areas. Depending on the overall space available, a large hole size should be selected which provides enough capacity per hole for the process conditions without being so large as to have inadequate sensitivity. The diameter of the larger holes determines the differential pressures at which the higher relief flows can occur. Large vent voids of approximately 0.15" diameter, would be expected to begin cracking open in the 2-5 psi range.

The minimum and maximum vent void sizes are based on the desired sensitivity of the valve in the low and high flow regimes and the contaminant characteristics of the fluid. Intermediate vent void sizes may be selected to assure good relieving capacity in the medium differential pressure range. The number of vent voids should be selected to achieve the desired maximum flow capacity. The full open flow of the valve can be approximated by analyzing the parallel transmittance provided by the parallel outlet vent voids. Diaphragm size, typically defined by the diameter, is preferably selected to allow for a reasonable spacing ratio between vent voids which is based, in part, on diaphragm movement gap or the maximum distance between the reference surface and interior of the reference housing.

The size of the process void is not a critical design parameter, but is preferably sized so that both the cross sectional area of the process void, and the cylindrical opening area between the process void and the retracted diaphragm (periphery multiplied by diaphragm movement gap) are both significantly larger than the sum total cross sectional area of all the vent voids.

The diaphragm movement gap, or the maximum distance between the reference surface, 20, and the reference housing, is a critical parameter. It affects the valve sensitivity and affects the optimum spacing of the vent void. The gap is preferably great enough that the cylindrical opening area (defined above), when the diaphragm is fully retracted against the reference housing is larger than the sum total of the vent voids. A total diaphragm movement gap of 0.1 inch is suitable for demonstration of the invention.

Each vent void must have an adequate free area around it so that the diaphragm can form a dimple shaped unsupported area. The size of this spacing is not related to the vent void size, but rather the gap distance that the diaphragm can move (distance between seat surface to reference housing surface). Increased vent void spacing tends to increase sensitivity up to a threshold ratio, and has less impact above that threshold ratio. This threshold ratio is dependant on diaphragm stiffness. A minimum hole spacing of 0.4 inches is adequate for demonstration of the present invention. The diaphragm movement gap of approximately 0.1 inch results in a vent void spacing to movement gap ratio of approximately 4:1.

The location of the vent voids is not a critical design parameter, assuming adequate spacing is provided. However, it is recommended that the smaller vent voids be located closer to the process void.

Figure 4:
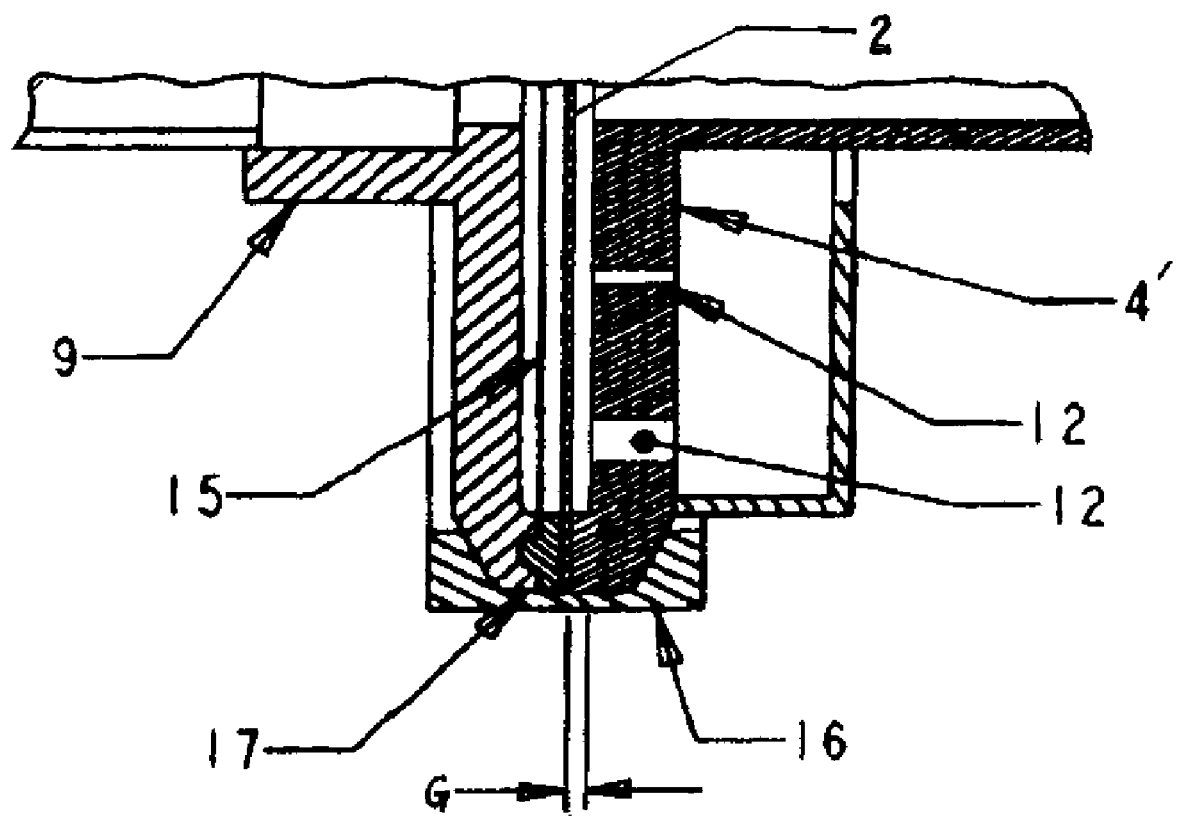
FIG. 4 is a partial cross-sectional view of an alternative method of mounting a diaphragm in the present invention.
Figure 5:
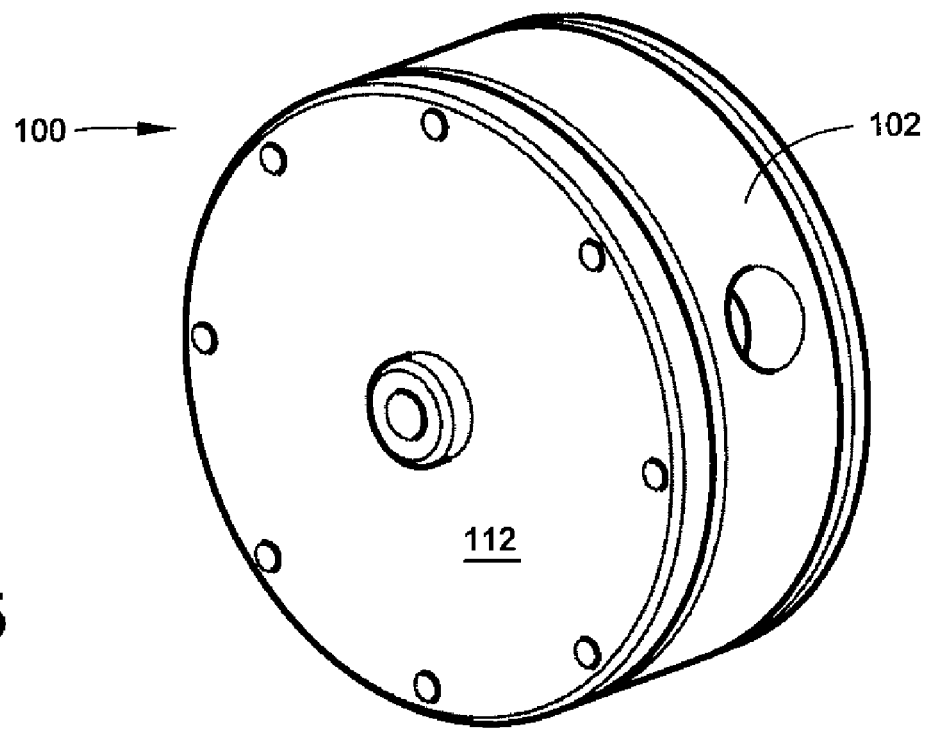
FIG. 5 is a top perspective view of a pressure regulating valve constructed according to an embodiment of the invention.
Figure 6:
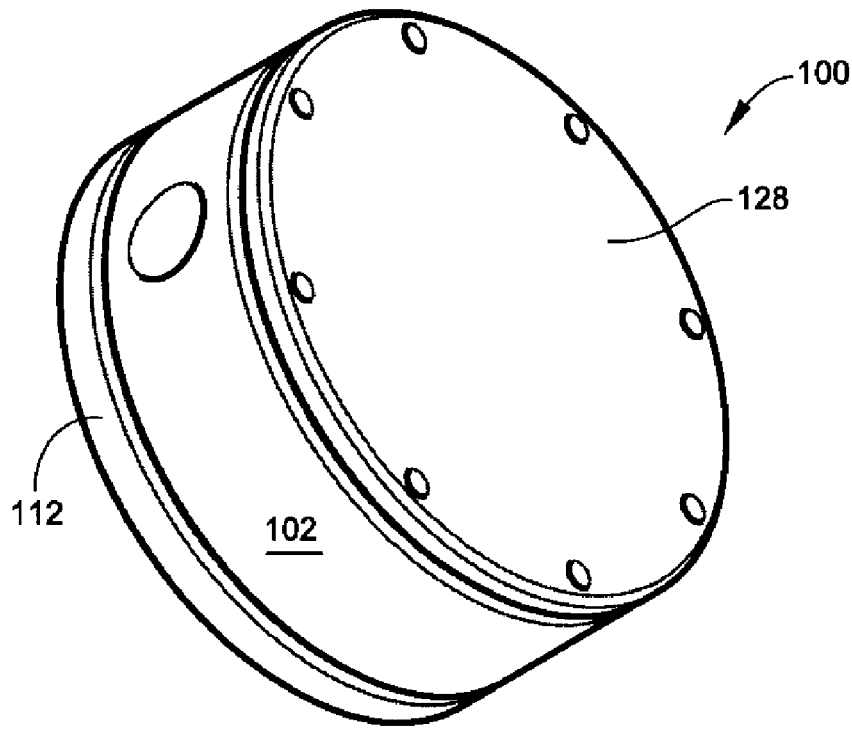
FIG. 6 is a bottom perspective view of a pressure regulating valve constructed according to an embodiment of the invention.
Figure 7:
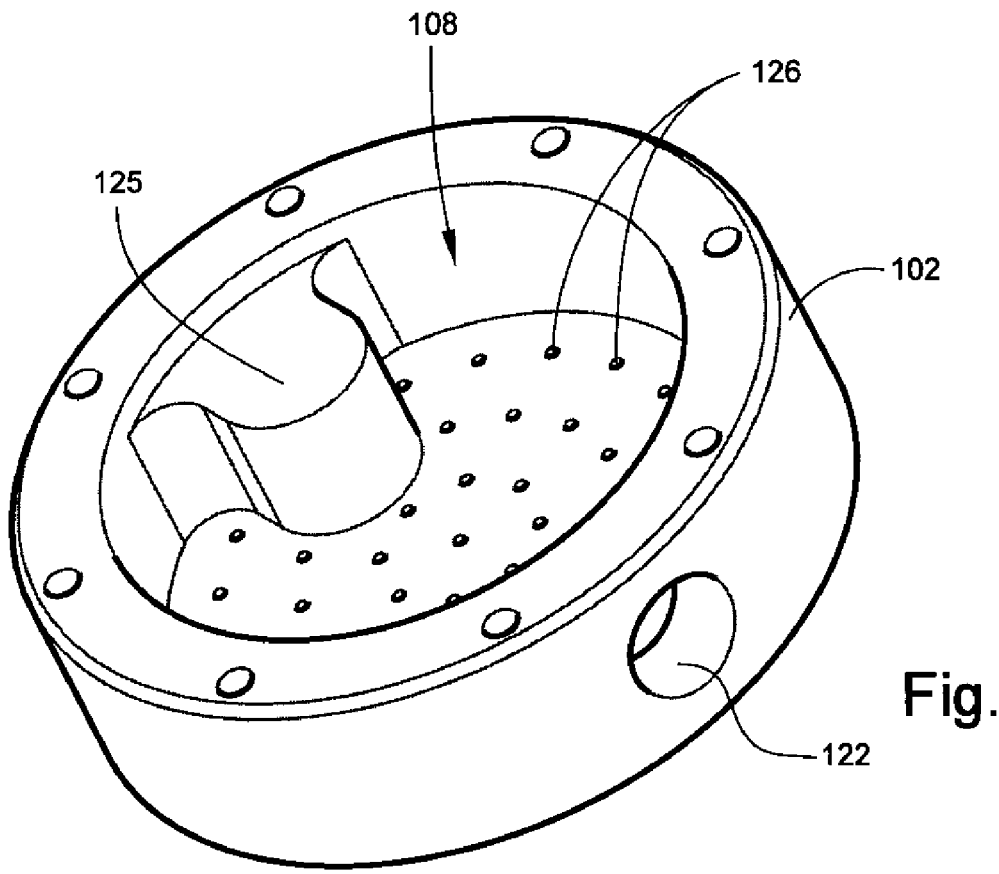
FIG. 7 is a bottom perspective view of the body of the pressure regulating valve of FIG. 5.
Figure 8:
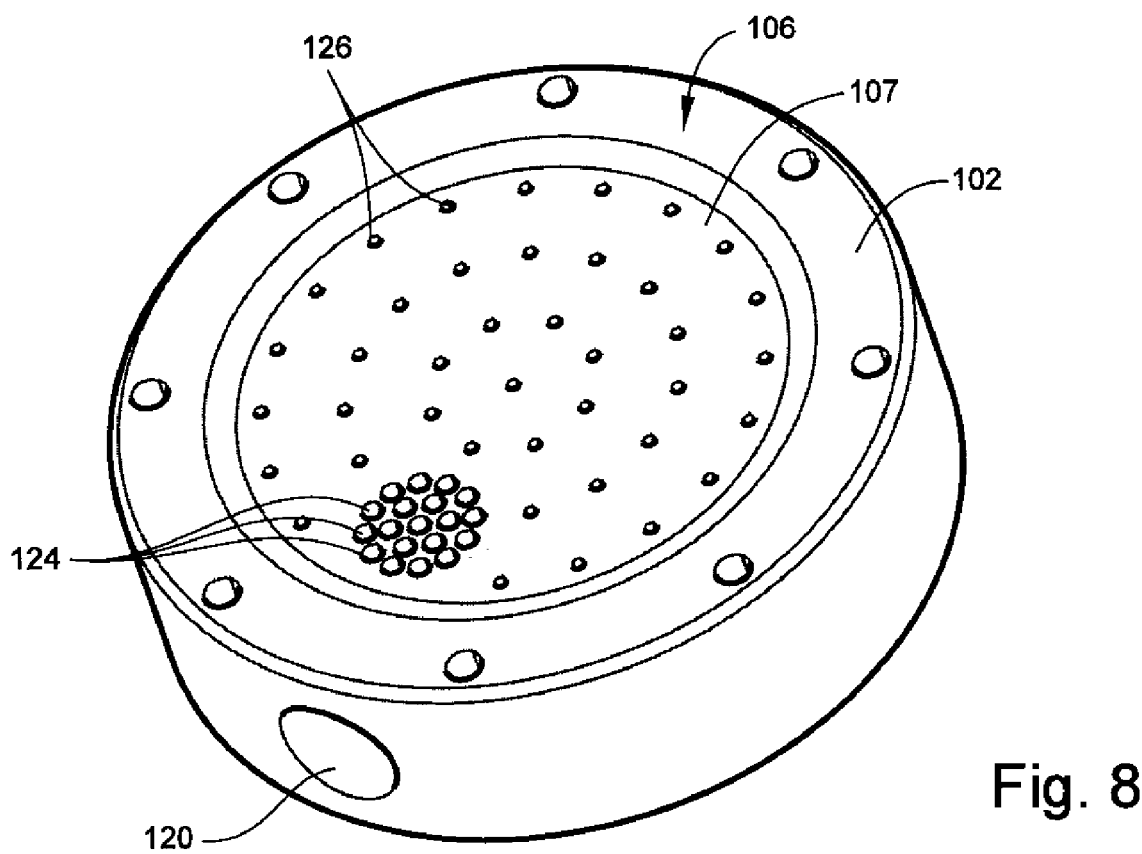
FIG. 8 is a top perspective view of the body of the pressure regulating valve of FIG. 5.
Figure 9:
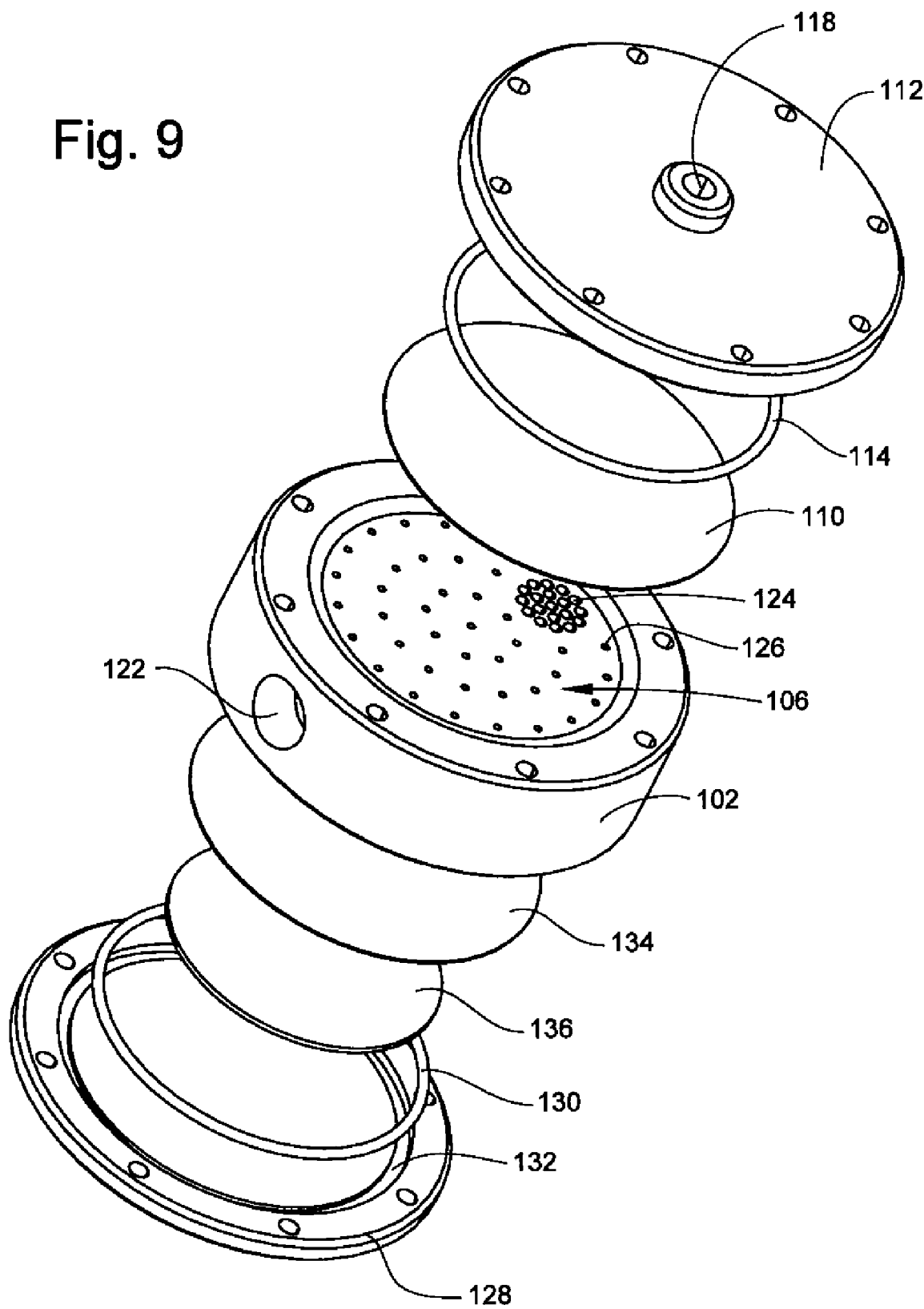
FIG. 9 is an exploded perspective view of the pressure regulating valve of FIG. 5.
Figure 10:
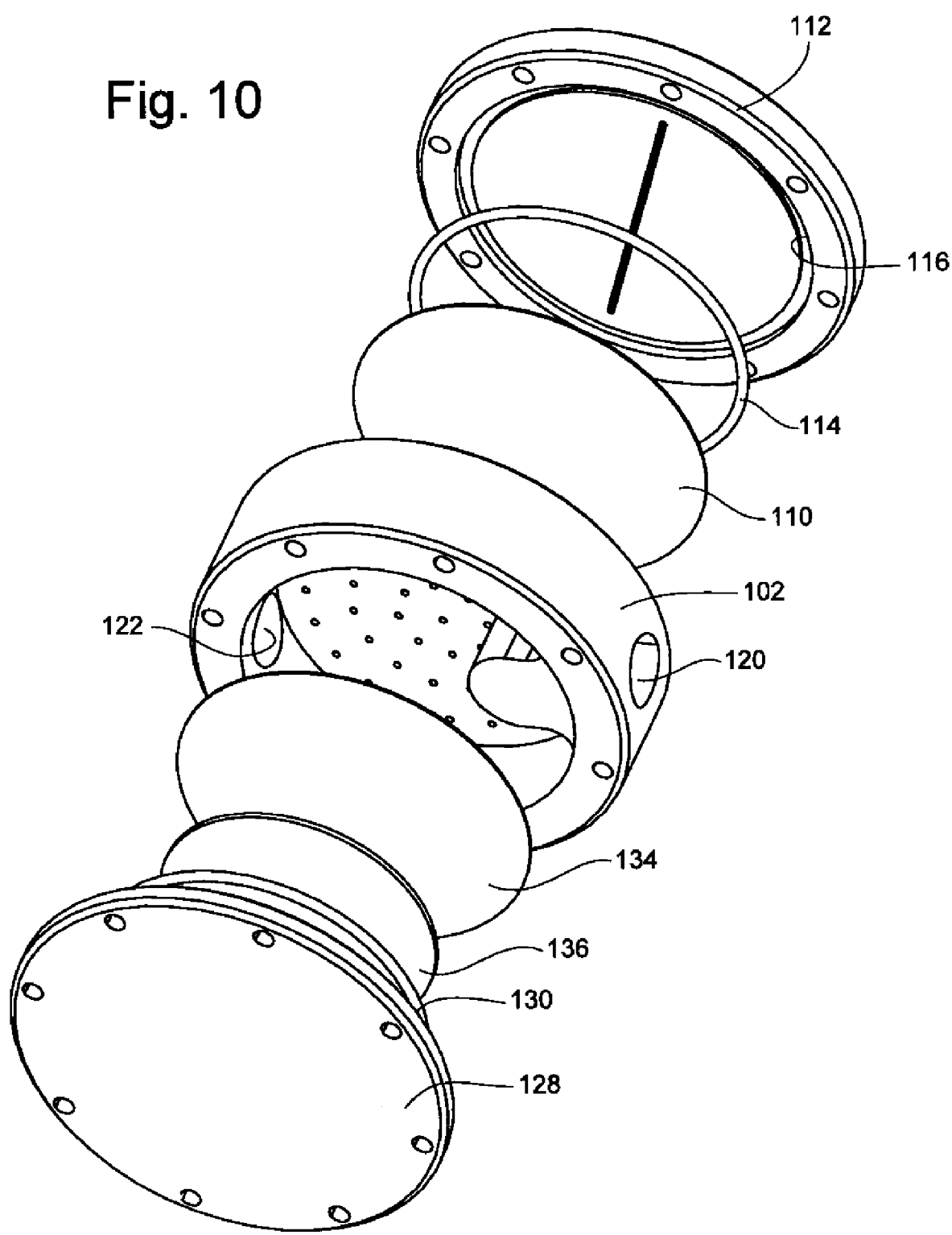
FIG. 10 is another exploded perspective view of the pressure regulating valve of FIG. 5.

Another variable in the performance of the valve is the location of the diaphragm's peripheral constraint relative to the gap between the process surface and the reference surface. Offset of the diaphragm constraint in the direction of the reference surface tends to bias the valve to relieve at lower, or even negative differential pressures, which can result in an unnecessary flow or waste of fluid. Good balanced performance, with negligible waste flow, can be achieved in the tested design by constraining the diaphragm directly along the process surface. The offset can be used to create a pressure bias. The modulated pressure relief valve can be configured utilizing shaped surfaces, such as concave or convex, on the diaphragm, process housing or both. Ribbing in the diaphragm, or process housing, can also be effectively utilized to alter the pressure bias between the process pressure and reference pressure at which venting occurs. If the modulated pressure relief valve is configured with an offset, for example, wherein the diaphragm is away from the process surface, for example, a positive pressure bias can be created wherein the modulated pressure relief valve vents at a process pressure which is lower than the reference pressure. This is also referred to in the art as an opening bias. FIG. 4 illustrates a valve having a slightly different process housing 4' which offsets the diaphragm 2 from the process housing 4' resulting in a gap "G" between the process housing 4' and the diaphragm 2. Alternatively, the modulated pressure relief valve can be configured such that a negative pressure bias is created wherein the process pressure must be higher than the reference pressure prior to venting. This would be referred to in the art as a closing bias.

The overall size of the diaphragm area ultimately determines the maximum possible relieving capacity. Increasing the overall size of the diaphragm area provides for greater potential relieving capacity, and can, when carefully combined with vent void size, spacing, and movement gap selection, offer greater pressure sensitivity at a given relieving capacity. A free diaphragm diameter of 2.9 inches is suitable for demonstration of the present invention.

The diaphragm's physical characteristics affect the relieving performance of the device. A reinforced elastomeric diaphragm, which is pliable to bending but is resistance to planar stretching, promotes higher sensitivities than un-reinforced diaphragms by increasing the effective size of the unsupported area around each vent void. In practice, a reinforced elastomeric diaphragm should be selected that is thin enough to be pliable, yet thick enough to withstand full system pressure stretched across the larger holes. Elastomeric stiffness, in Durometers, is not believed to be a critical factor for thin diaphragms. A 1/32" thick fabric reinforced rubber sheet with a typical or moderate hardness, such as a Shore A durometer in 50-80 range, is particularly suitable for demonstration of the present invention.

The reference pressure source is a fluid source wherein the pressure of the fluid source can be accurately controlled. Particularly preferred fluids include gases. A particularly preferred gas comprises nitrogen with a most preferred fluid being air. Liquids can also be employed but are less desirable.

The separator is preferably a chamber which allows fluids to separate from liquids in a stream. Separators are commonly employed to remove moisture from air streams wherein the air stream originates from a compressed air source. It is not uncommon for moisture to be entrained with the air flow and a separator allows the moisture to separate from the air flow. A separator can also provide a reservoir which acts to absorb, or dampen, rapid changes in pressure without transmitting the rapid pressure change further down the process line. For example, with water flow systems, an air reservoir may be employed to eliminate the phenomenon commonly referred to as "hammering" or "bumping" due to rapid changes in pressure.

The process system is any system commonly employed in manufacturing environments wherein the pressure must be maintained at or below an upper maximum. The present invention is suitable for use with fixed reaction kettles where the pressure in the reaction kettle must be monitored and with flow systems wherein the pressure build of flowing materials must be monitored It would be well within the ability of those with ordinary skill in the art to capture the material as it escapes from the vent voids or to redirect the material to a location of minimal concern.

FIGS. 5-11 illustrate a pressure regulating valve 100 constructed according to an alternative embodiment of the invention. The term "pressure regulating valve" is used here generically to refer to a device which is responsive to differential pressures applied thereto and which is capable of functioning as either a back pressure regulator or as a relief valve, depending on how it is arranged within a fluid system.

For purposes of explanation, it is noted that "back pressure regulator" and "relief valve" are two similar terms which describe the same functional device, though with different operational emphases. For relief valves, the emphasis is on the off/on flow interface, with expectations of zero flow through the device up to some predetermined set pressure, and maximum flow above the set pressure. For back pressure regulators, the emphasis is often on steady state flow control over a defined flow rate window, with less emphasis on the off/on flow threshold.

The pressure regulating valve 100 includes a body 102, which may be cast, machined, or built-up from separate components. The material of the body 102 is selected to suit a particular application based on requirements such as temperature, pressure, chemical compatibility, etc. Non-limiting examples of suitable materials which are chemical-resistant include 316 stainless steel, PVC, brass, and polytetrafluoroethylene (PTFE). The body 102 includes a wall 104 whose first side defines a process surface 106. An exhaust chamber 108 is formed in the body 102 and is bounded at least in part by the second side of the wall 104.

Figure 11:
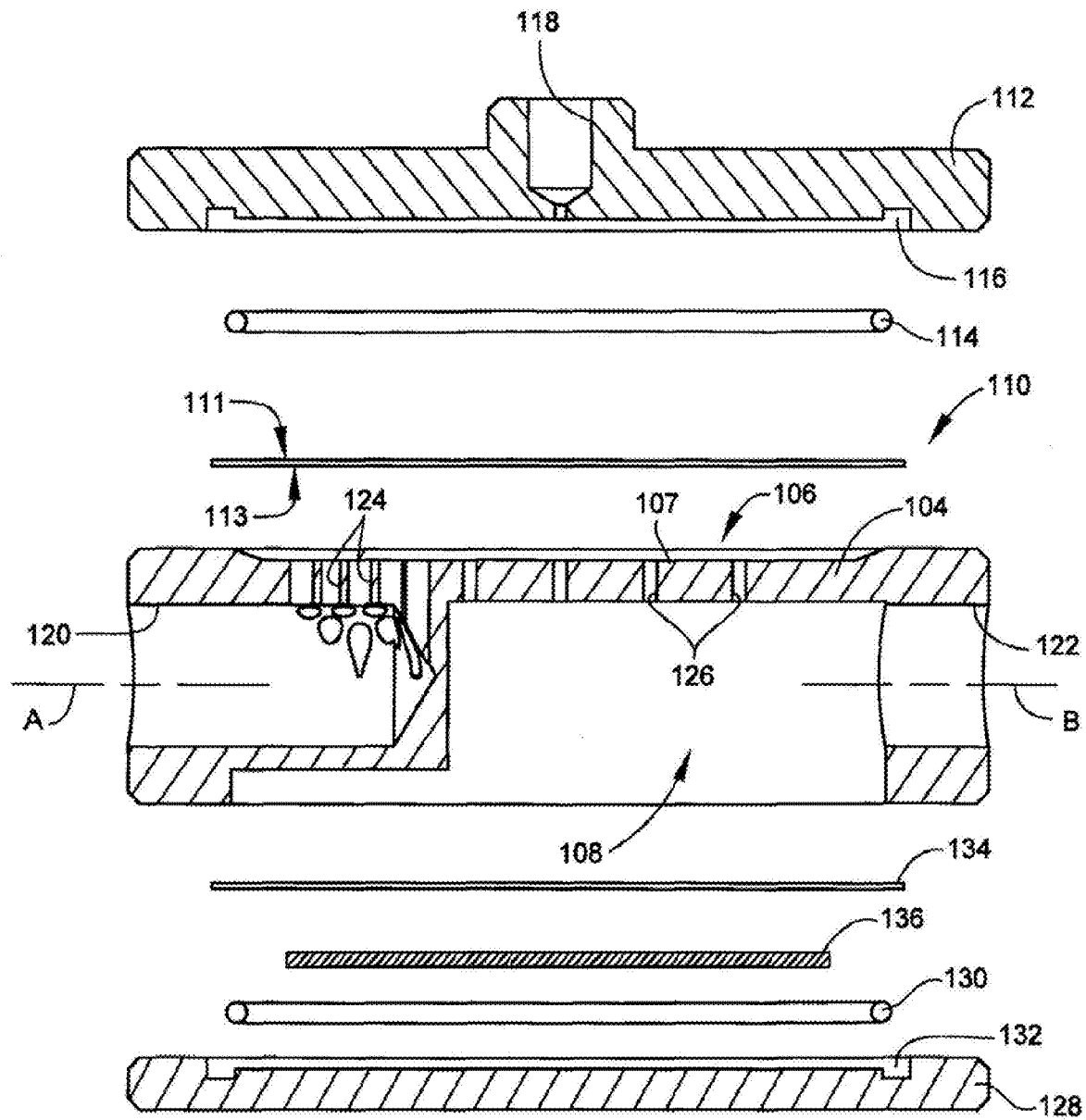
FIG. 11 is an exploded cross-sectional view of the pressure regulating valve of FIG. 5.

A primary membrane 110 having opposed reference and process sides 111 and 113 is disposed adjacent the reference surface 106. The perimeter of the primary membrane 110 is secured against the body 102. In the illustrated example, the primary membrane 110 is secured to the body 102 by a relatively rigid reference housing 112 which may be attached to the body 102 by fasteners or clamps. As best seen in FIG. 11, the process surface 106 may include a recessed portion 107 which is displaced away from the plane of restraint of the primary membrane 110, effectively biasing the primary membrane 110 towards a flow-permitting position. The shape of the process surface 106 and the restraint position of the primary membrane 110 may be varied to achieve a desired opening or closing bias as described above with respect to the pressure relief valve 1. Optionally, an additional seal such as the illustrated resilient O-ring 114 may be provided, which is received in an annular groove 116 in the reference housing 112. A reference port 118 is formed in the reference housing 112 and is disposed in fluid communication with the reference side 111 of the primary membrane 110.

Inlet and outlet ports 120 and 122 are also formed in the body. The central axes "A" and "B" of these ports may be coplanar or substantially coplanar with each other, and the plane of these axes may be parallel with the primary membrane 110, as constrained between the body and the reference housing 112. These two ports may be diametrically opposed relative to the body 102 and co-axial with each other well. At least one process void 124 is disposed in fluid communication with the inlet port 120 and the reference surface 106. In the illustrated example, a boss 125 which protrudes into the exhaust chamber 108 forms the flow path from the inlet port 120 to the vent process void 124. At least one vent void 126 is disposed in fluid communication with the outlet port 124 and the reference surface 106.

The function of the process void 124 is to bring the process fluid into the process pressure regulating valve 100. Its size does not have a critical impact on the function of the pressure regulating valve 100 so long as it is sized to be significantly larger than the total area of the vent voids 126, thereby not contributing significantly to the pressure drop through the pressure regulating valve 100. The process void 124, however, can become a potential point of failure for the primary membrane 110 if it presents the largest span of unsupported opening in the pressure regulating valve 100, Such a failure might occur if the pressure regulating valve 100 had a relatively high differential pressure across the primary membrane 110, such as when the reference pressure was high while the process fluids were not pressurized or flowing through the pressure regulating valve 100. It is therefore helpful to reinforce the process void 124, for example by use of a grid or screen (not shown), or by machining or otherwise forming the process void 124 in such a way that supporting material is present inside the boundary of the process void 124 to reinforce the primary membrane 110. In one configuration, this supporting material therefore forms multiple openings within the process void 124, or effectively multiple process voids 124, as seen most clearly in FIG. 8. These multiple process voids 124 do not change the fundamental way in which the pressure regulating valve 110 functions.

The diameter and spacings of the vent voids 126 may be selected as described above with respect to the pressure relief valve 1. In the illustrated example, the vent voids 126 are of equal diameter and are arranged in concentric rings; however they may be disposed in a different pattern or may vary in diameter.

The exhaust chamber 108 is closed off by a relatively rigid bottom cap 128 which is attached to the body 102, for example using fasteners or clamps (not shown). Optionally, an additional seal such as the illustrated O-ring 130 may be provided, which is received in an annular groove 132 in the bottom cap 128.

The pressure regulating valve 100 may include means for inhibiting chatter. One such means would be the inclusion of a compressible member in fluid communication with the outlet port 126. A compressible object (not illustrated) such as open or closed cell foam can be disposed directly in the outlet port 126. In the illustrated example (see FIGS. 9-11 in particular), a secondary membrane 134 is disposed between the body 102 and the bottom cap 128. A compressible member 136, which in this case takes the form of a relatively thin disk, is disposed between the secondary membrane 134 and the bottom cap. The bulk compressibility of the compressible member 136 will vary depending on the application in which the pressure regulating valve 100 is used, with the bulk compressibility being greater for greater process pressures. For an application in which the exhaust (downstream) pressure is near atmospheric, the bulk compressibility should be lower than about 517 kPa (75 psi) in order to provide for maximum effectiveness. As an non-limiting example, open or closed cell elastomeric or polymeric foams with density less than about 0.3 g/cm$^3$ (18.7 lbs./ft.$^3$) have been found to be suitable for such applications.

The primary and secondary membranes 110 and 134 may be constructed from a material which is chemically inert and/or chemically resistant. One example of such a material is fiber reinforced PTFE sheeting. When combined with a chemically inert and/or chemically resistant body material as described above, the pressure regulating valve 100 is made fully compatible for aggressive chemical contact. Because the O-rings 114 and 130 (if used) are not wetted in this configuration, low-cost commercial rubber O-ring material may be used. For very low pressure applications, e.g. below about 0.2 kPa (4 psi), a thin film, for example, thermoplastic films in the range of about 0.012 mm (0.0005 in.) to 0.15 mm 0.006 in.) thick have been found to be especially well suited for use as membranes in low pressure applications. Polyolefin film with thicknesses of about 0.051 mm (0.002 in.) to about 0.1 mm (0.004 in.) are the most preferred thermoplastic films. Also well suited for membranes in these low pressure applications is rubber sheeting with fabric reinforcement. A Buna N rubber sheeting with a thickness of substantially less than about 0.51 mm (0.02 in.), and preferably about 0.25 mm (0.01 in.), with nylon woven reinforcement, is highly suitable.

Figure 12:
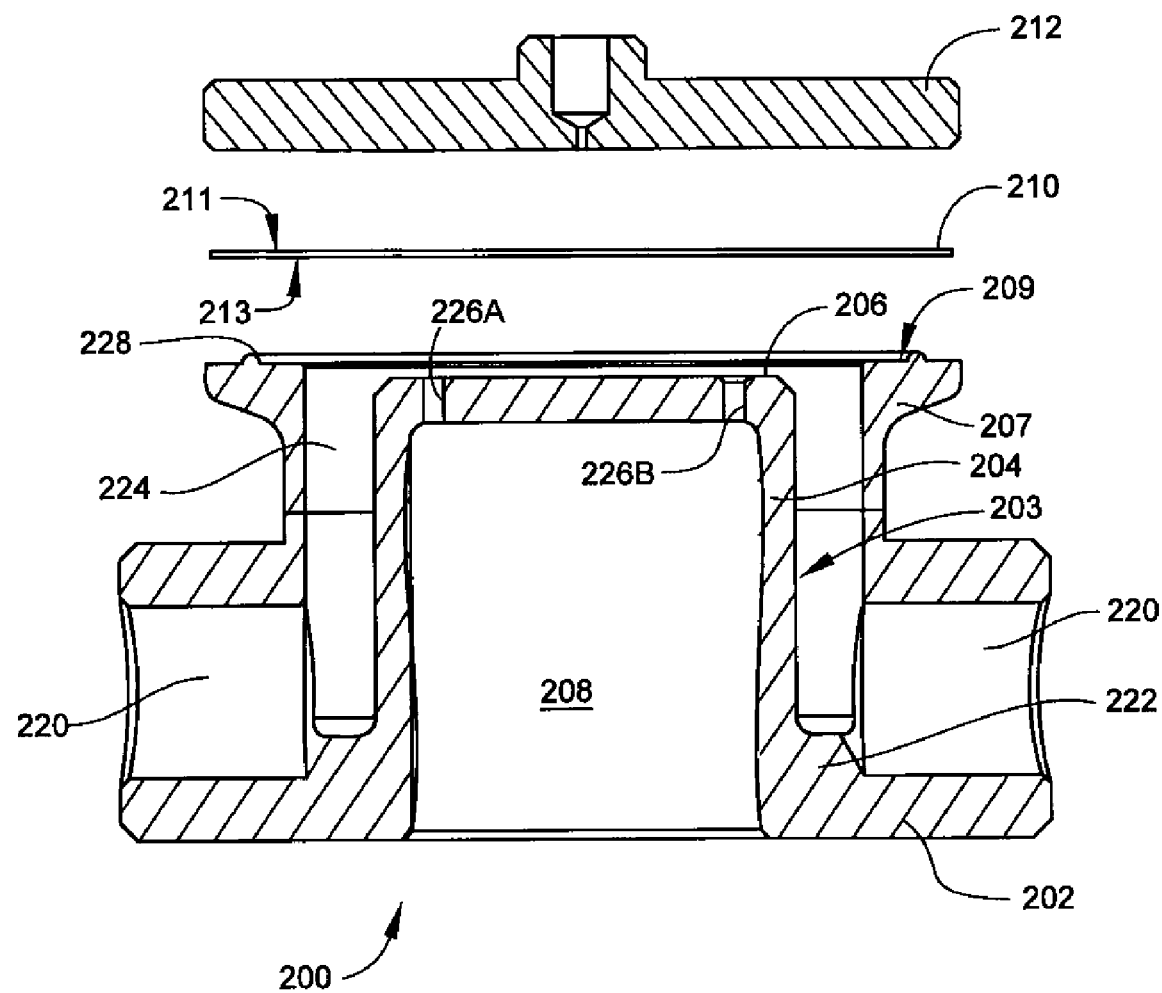
FIG. 12 is an exploded cross-sectional view of an alternative pressure regulating valve.

The operating principle of the pressure regulating valve 100 is substantially similar to that of the pressure relief valve 1 described above. During normal balanced or modulating mode the primary membrane 110 is drawn into a sealing relationship with the vent voids 126 due to the pressure differential between the vent pressure and reference pressure. When the vessel pressure exceeds the reference pressure the area of the primary membrane 110 between the vent voids 126 is persuaded away from the vent voids 126 thereby allowing venting. This motion, however, is limited by the reference pressure exerted on the inner surface of the reference housing 112. The primary membrane 110 is forced into an irregular pattern, with regions closely surrounding the vent voids 126 being unsupported by the process surface 106 of the main body 102, and therefore trying to pull the primary membrane 110 out of contact with the vent void 126. At the smallest holes, the ratio of unsupported diaphragm area to vent void area can be very high, such as 400:1 for example. When the ratio of pressure differential ratio, which is defined as the differential Vessel-Reference divided by Reference-Vent, rises to the area ratio, which is defined by the unsupported membrane area divided by the area of the vent void 126, then that particular vent void 126 begins to crack open or modulate. As the vessel pressure further increases, more vent voids open. At higher differential pressures, such as several PSI, the entire hole pattern opens up to allow higher venting volume flow FIG. 12 illustrates a pressure regulating valve 200 constructed according to another alternative embodiment of the invention. The pressure regulating valve 200 includes a body 202, which may be cast, machined, or built-up from separate components. The material of the body 202 is selected to suit a particular application based on requirements such as temperature, pressure, chemical compatibility, etc. Examples of suitable chemical-resistant materials include 316 stainless steel and polytetrafluoroethylene (PTFE). The body 202 includes an upstanding cylindrical central chamber 203 with a wall 204 whose first side defines a process surface 206. An exhaust chamber 208 is formed in the body 202 and is bounded at least in part by the second side of the wall 204. An outer wall 207 surrounds the central chamber 203.

Process ports 220 are formed in the body 202. The longitudinal axes of these ports may be coplanar with each other. These two ports may be diametrically opposed relative to the body 202 and co-axial with each other as well. At least one process void 224 is disposed in fluid communication with the process port 220 and the reference surface 206, and at least one vent void 226 is disposed in fluid communication with the exhaust chamber 208 and the reference surface 206.

A square-edged (unchamfered) vent void is depicted at 226A, and a chamfered vent void is depicted at 226B. Chamfering or rounding of the vent and/or process void entrance surfaces (not shown) is an effective way to prevent stress concentrations in the membrane (described below). Such enlargements tend to slightly increase the overall flow relieving capacity of the pressure regulating valve 200, while slightly decreasing its cracking pressure precision (by increasing the effective vent void cross sectional area).

The process void 224 is formed as a large annular ring surrounding the central chamber 203. The annular ring 224 allows fluid to flow unimpeded between the multiple process ports 220 while also allowing fluid to enter the process volume and flow through the vent voids 226 as necessary to control process pressure closely to the reference pressure. The process ports 220 may be threaded or they may be smooth depending on the type of connection used.

A membrane 210 having opposed reference and process sides 211 and 213 is disposed adjacent the reference surface 206. The perimeter of the membrane 210 is secured against the body 202. In the illustrated example, the membrane 210 is secured to the body 202 by a relatively rigid reference housing 212 which may be attached to the body 202 by fasteners or clamps. A top surface 209 of the outer wall 207 is used to constrain the membrane. In the illustrated example, there is a slight gap between the plane of the process surface 206 and the plane of the membrane constraint surface 209. This gap gives a slight opening bias to the pressure regulating valve 200 by forcing the membrane 210 to distend slightly in order to close the vent voids 226. However, this gap also accommodates higher discharge flow rates to the exhaust chamber 208 by minimizing the distention of the membrane at higher flowrates. Optionally, a raised boss 228 may be provided to upper surface 209. This can aid in the successful sealing and constraint of the membrane 210, especially when using a non-wetted compliant gasket (not shown) on the reference side 211 of the membrane 210.

The operational principles of the pressure regulating valve 200 are substantially the same as those of the pressure relief valve 1 described above.

Figure 13:
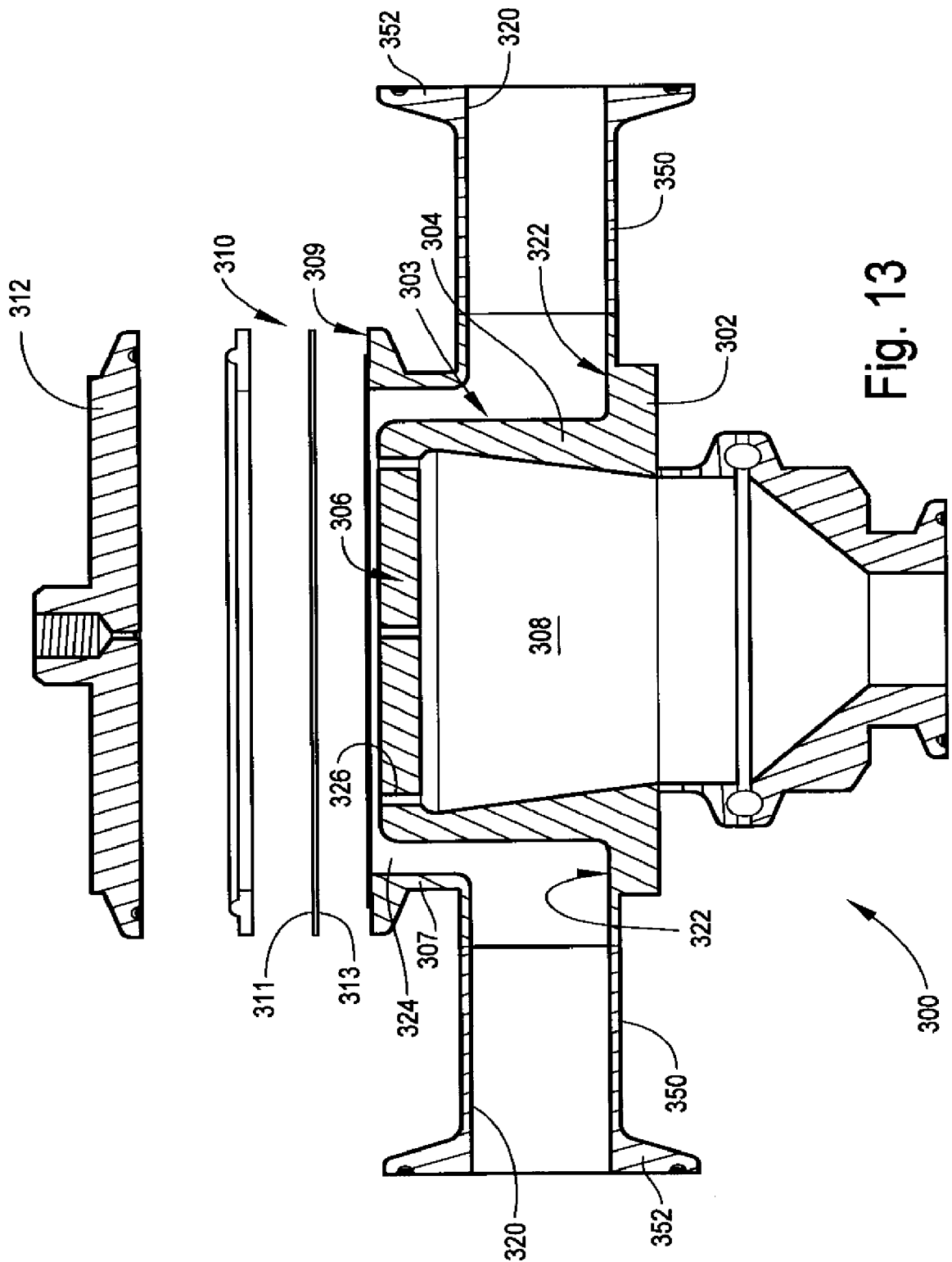
FIG. 13 is an exploded cross-sectional view of another alternative pressure regulating valve.

FIG. 13 illustrates another pressure regulating valve 300 constructed according to another alternative embodiment of the invention. The pressure regulating valve 300 includes a body 302, which may be cast, machined, or built-up from separate components. The material of the body 302 is selected to suit a particular application based on requirements such as temperature, pressure, chemical compatibility, etc. Examples of suitable chemical-resistant materials include 316 stainless steel and polytetrafluoroethylene (PTFE). The body 302 includes an upstanding cylindrical central chamber 303 with a wall 304 whose first side defines a process surface 306. An exhaust chamber 308 is formed in the body 302 and is bounded at least in part by the second side of the wall 304. An outer wall 307 surrounds the central chamber 303.

Process ports 320 are formed in the body 302. The longitudinal axes of these ports may be coplanar with each other. These two ports may be diametrically opposed relative to the body 302 and co-axial with each other as well. At least one process void 324 is disposed in fluid communication with the process port 320 and the reference surface 306, and at least one vent void 326 is disposed in fluid communication with the exhaust chamber 308 and the reference surface 306. The process ports 320 may be contained within tube-like extensions 350 including flanges 352 suitable for connection to a fluid system by welding, hygienic clamps, or similar methods.

Square-edged (unchamfered) vent voids are depicted at 326. Chamfering or rounding of the vent and/or process void entrance surfaces (not shown) is an effective way to prevent stress concentrations in the membrane as described above. Such enlargements tend to slightly increase the overall flow relieving capacity of the pressure regulating valve 300, while slightly decreasing its cracking pressure precision (by increasing the effective vent void cross sectional area).

The process void 324 is formed as a large annular ring surrounding the central chamber 303. The annular ring 324 allows fluid to flow unimpeded between the multiple process ports 320 while also allowing fluid to enter the process volume and flow through the vent voids 326 as necessary to control process pressure closely to the reference pressure. The process ports 320 may be threaded or they may be smooth depending on the type of connection used. In the illustrated example, the surface 322 depicted at the lower portion of the process void 324 is flush with the lowest portion of the interior surface of the process ports 320. When used with smooth-interior process ports 320, this provides a hygienic, fully drainable design suitable for food, pharmaceutical, and other sanitary applications.

A membrane 310 having opposed reference and process sides 311 and 313 is disposed adjacent the reference surface 306. The perimeter of the membrane 310 is secured against the body 302. In the illustrated example, the membrane 310 is secured to the body 302 by a relatively rigid reference housing 312 which may be attached to the body 302 by fasteners or clamps. A top surface 309 of the outer wall 307 is used to constrain the membrane. In the illustrated example, there is a slight gap between the plane of the process surface 306 and the plane of the membrane constraint surface 309. This gap gives a slight opening bias to the pressure regulating valve 300 by forcing the membrane 310 to distend slightly in order to close the vent voids 326. However, this gap also accommodates higher discharge flow rates to the exhaust chamber 308 by minimizing the distention of the membrane at higher flowrates. Optionally, a raised boss (not shown), similar to boss 228 described above, may be provided to upper surface 309. This can aid in the successful sealing and constraint of the membrane 310, especially when using a non-wetted compliant gasket (not shown) on the reference side 311 of the membrane 310.

The operational principles of the pressure regulating valve 300 are substantially the same as those of the pressure relief valve 1 described above.

The precision obtainable by pressure regulating technology described above is largely dependant on the size, number, and spacing of the vent voids in relation to the overall area of the diaphragm or membrane. As an example, a 1.7 kPa (¼ psi) precision in a common industrial pressure regulating environment of 0 to 690 kPa (100 psi), or a mean pressure of 517 kPa (75 psi), could be described as 0.5%. However, many commercial applications, even those described as "precision" are easily satisfied by a precisions of 1%, 2%, or even 3%. In practical terms, the cracking pressure precision of a regulator is crudely approximated by the ratio of total vent void area divided by the free diaphragm or membrane area (especially where the size and spacing of the vent voids are as described above).

High flow precision, especially for liquids and most especially for viscous liquids, is governed more by the overall total cross sectional area of the vent voids and process voids. Therefore, proper design of the device for required precision is a balance between cracking pressure precision, (which is improved by increasing diaphragm or membrane area and limiting vent void area), and high flow precision, which is improved by principally by increasing total void area.

These principles hold even for control of extremely low pressures, giving the pressure regulating devices described above extraordinary precision in the pressure range below about 6.9 kPa (1 psi). Ultra low pressure control can be achieved by the connection of a static fluid head (preferably water) to the reference port as a convenient method of generating a stable reference pressure. Practically speaking, these designs are highly suitable for use with reference pressures down to the range of about 0.01 psi. For a valve with 1% cracking pressure precision and a setpoint of 0.2 psi, the low flow (or cracking) precision of such a device would be expected to be approximately 0.002 psi.

Many commercial applications are more concerned with pressure stability across a specified flow range than they are with cracking pressure precision. By way of a non-limiting example, a pressure regulating device as described above with approximately 5.1 cm (2 in.) free diaphragm or membrane diameter with twelve 1.8 mm (0.07 in.) diameter vent voids can control from about 0 to about 50 ml/min. of air flow at about 6.9 kPa (1 psi) setpoint (reference pressure), with overpressure increasing only from about 0.069 kPa (0.01 psi) to about 0.48 kPa (0.07 psi) through the range. At about 13.8 kPa (2 psi) setpoint, the overpressure through the same flowrate range would increase only from about 0.01 kPa (0.015 psi) to about 0.62 kPa (0.09 psi). In each case, the pressure precision is better than about 2%. Such precision can also be maintained at very high pressures, e.g. several hundred psi.

The invention has been described with particular reference to the preferred embodiments which are intended to enable one of ordinary skill in the art to demonstrate the present invention. The preferred embodiments are not intended to limit the scope of the present invention which is set forth in the claims appended hereto.

What is claimed is:

1. A pressure regulating valve comprising:
   a body including:
   a wall with a first side which defines a process surface, at least one process void disposed in the process surface and adapted to be disposed in fluid communication with a fluid at a process pressure, and at least one vent void disposed in the wall separate from the process void and disposed in parallel flow communication with the membrane;

an inlet port disposed in fluid communication with the at least one process void;

an exhaust chamber disposed in fluid communication with the at least one vent void;

an outlet port disposed in fluid communication with the exhaust chamber;

a reference housing adapted to be disposed in fluid communication with a fluid at a predetermined reference pressure;

a first membrane having opposed reference and process surfaces, the first membrane constrained in a predetermined plane between the body and the reference housing, and arranged such that, when the reference pressure is higher than the process pressure the first membrane is engaged with the vent void, and when the process pressure is higher than the reference pressure, the first membrane is not engaged with the vent void;

a bottom cap secured to the body;

a flexible second membrane constrained between the body and the bottom cap, in sealing relationship with the exhaust chamber, with a first surface thereof disposed in communication with the exhaust chamber; and a compressible member disposed in contact with a surface of the second membrane opposite the first surface thereof, so as to absorb pulsation energy during the operation of the pressure regulating valve.

2. The pressure regulating valve of claim 1 wherein the wall includes
a plurality of process voids disposed in the process surface and at least three vent voids disposed in the wall separate from the process voids, wherein a continuous portion of the process surface that contains the process and vent voids is free of protrusions and recesses except for the process and vent voids; and
wherein a central axis of the of the outlet port lies substantially in a single plane with a central axis of the inlet port.

3. The pressure regulating valve of claim wherein the central axes of the inlet and outlet ports are parallel to the plane of constraint of the first membrane.

4. The pressure regulating valve of claim 2 where the central axes of the inlet and outlet ports are collinear with each other and disposed on opposite sides of the body.

5. The pressure regulating valve of claim 2 wherein the process voids have a combined cross sectional area greater than a combined cross sectional area of all of the vent voids.

6. The pressure regulating valve of claim 2 wherein a compliant first seal is disposed between the first membrane and the reference housing, the seal being separated from the process surface by the first membrane.

7. The pressure regulating valve of claim 6 wherein the first seal is an O-ring.

8. The pressure regulating valve of claim 2 where the valve is operable to maintain the process pressure within about 2% or less of the reference pressure.

9. The pressure regulating valve of claim 1 wherein a compliant second seal is disposed between the second membrane and the bottom cap, the second seal being separated from the exhaust chamber by the second membrane.

10. The pressure regulating valve of claim 9 wherein the first seal is an O-ring.

11. The pressure regulating valve of claim 1 wherein a bulk modulus of compressibility of the compressible member is less than about 75 psi.

12. The pressure regulating valve of claim 1 where the compressible member comprises a foam having a density of less than about 0.3 g/cm$^3$.

13. The pressure regulating valve of claim 1 where the valve is operable to control a process pressure at a set point in the range of about 0.01 psi to about 1.0 psi.

14. The pressure regulating valve of claim 13 where the valve is operable to maintain the process pressure within about 2% or less of the set point.

15. The pressure regulating valve of claim 1 wherein the first membrane is a thermoplastic film having a thickness of about in the range of 0.0005 in. to about 0.006 in.

16. The pressure regulating valve of claim 1 where the valve is operable to maintain the process pressure within about 2% or less of the reference pressure.

17. The pressure regulating valve of claim 2 wherein the first membrane is a fiber-reinforced elastomeric membrane with a thickness of substantially less than 0.020 inches.

18. The pressure regulating valve of claim 17 wherein the first membrane has a thickness of about 0.010 inches.

19. The pressure regulating valve of claim 2 wherein a predetermined gap for allowing movement of the first membrane is provided, and where the gap is selected to be small enough such that the first membrane will contact the reference housing at a predetermined operating pressure.

20. The pressure regulating valve of claim 19 where the predetermined gap is approximately 0.1 inch.

* * * * *

UNITED STATES PATENT AND TRADEMARK OFFICE
CERTIFICATE OF CORRECTION

PATENT NO. : 7,673,650 B2   Page 1 of 1
APPLICATION NO. : 11/459816
DATED : March 9, 2010
INVENTOR(S) : Jeffrey D. Jennings It is certified that error appears in the above-identified patent and that said Letters Patent is hereby corrected as shown below:

Col. 17, Claim 3, line 40, insert -- 2 -- after "claim".

Signed and Sealed this
Nineteenth Day of April, 2011

David J. Kappos
*Director of the United States Patent and Trademark Office*